United States Patent [19]
Payne et al.

[11] 3,866,205
[45] Feb. 11, 1975

[54] LOCKING DEVICE WITH ALARM UTILIZING FLEXIBLE GAS IMPERMEABLE TUBE

[76] Inventors: Louis B. Payne, 1465 Jersey St.; Russell G. Overgard, 950 Everett St., both of Denver, Colo. 80215

[22] Filed: Apr. 18, 1973

[21] Appl. No.: 352,254

[52] U.S. Cl. ............... 340/280, 340/63, 340/240
[51] Int. Cl. ........................................ G08b 21/00
[58] Field of Search .................. 340/240, 63, 280; 200/82 R; 116/33, 65

[56] References Cited
UNITED STATES PATENTS
627,037  6/1899  Wybro .......................... 340/240 R Primary Examiner—Harold J. Pitts
Attorney, Agent, or Firm—Hume, Clement, Brinks, Willian, Olds & Cook, Ltd.

[57] ABSTRACT

There is disclosed a locking apparatus having an alarm for detecting the tampering with of a portion of the locking apparatus. The locking apparatus comprises a housing having a gas impermeable tube lockably connected to the housing, a sensing means, and an alarm located within the housing. If pressure in the gas impermeable tube is decreased, indicative of cutting or tampering with the tube, the sensing means senses this decrease in pressure and actuates the alarm. Two embodiments of the alarm are shown, one being a gas actuated alarm and one being an electrically actuated alarm, both of which are actuated in response to a decrease in pressure in the gas impermeable tube.

15 Claims, 7 Drawing Figures

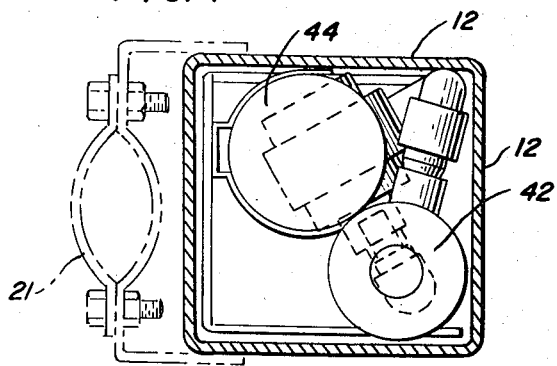
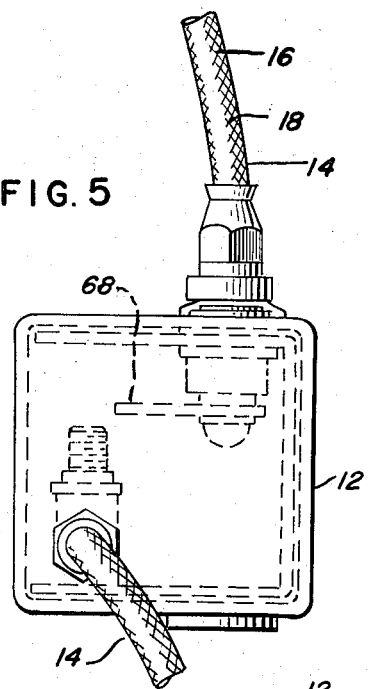
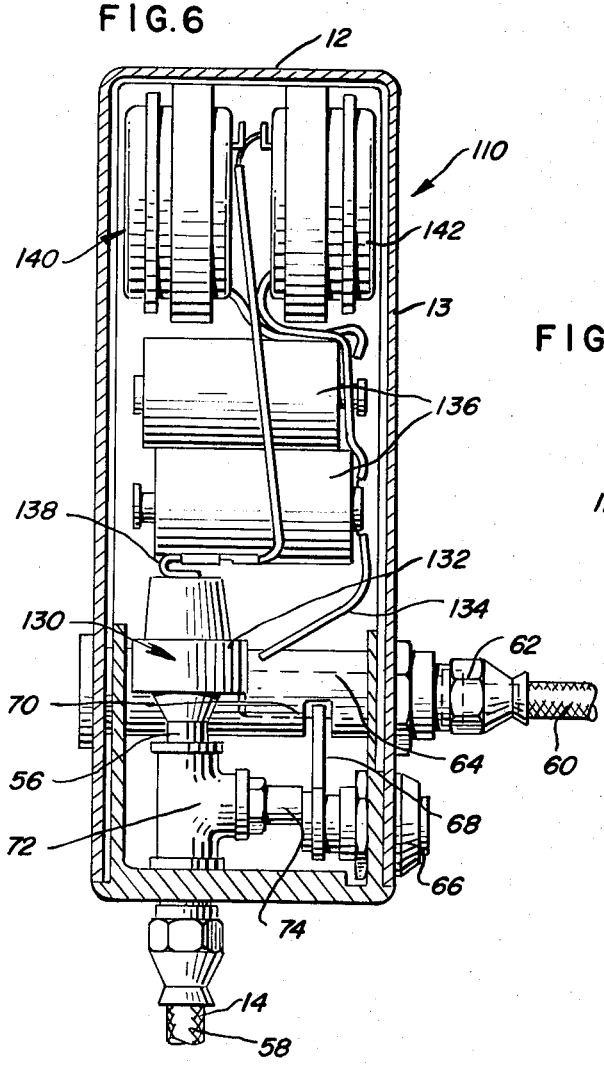
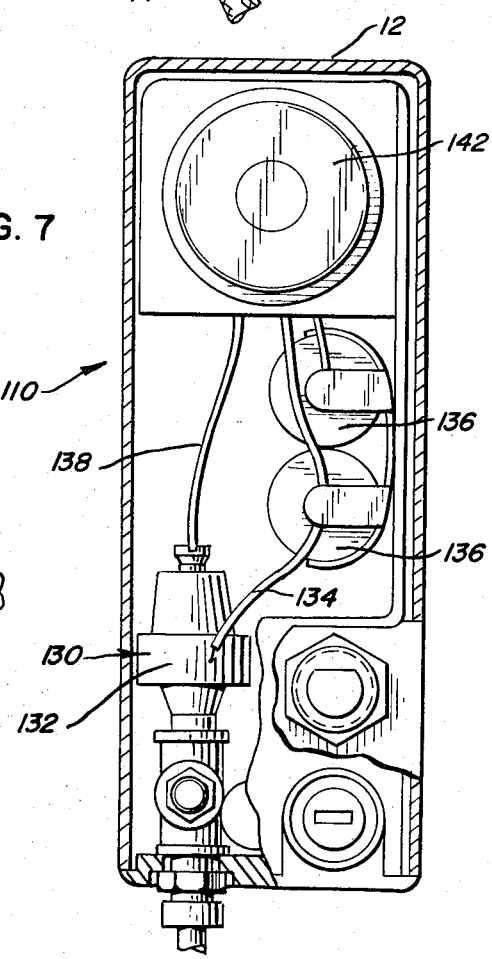

LOCKING DEVICE WITH ALARM UTILIZING FLEXIBLE GAS IMPERMEABLE TUBE

BACKGROUND OF THE INVENTION

The present invention relates to locks and more particularly to a lock device which is operative to give an audible warning sound whenever an attempt is made to sever or tamper with the locking device. Those concerned with the development of locking devices have long recognized the need for a locking device particularly suitable for use with a bicycle or motorcycle, which when tampered with, will emit a warning sound or alarm. Typically, bicycles and/or motorcycles may be locked by using a cable which is passed through a portion of the frame of the bicycle or motorcycle and then secured around an immovable object such as a telephone pole or bicycle rack. Although such devices have served the purpose, they have not proved entirely satisfactory under all conditions of service in that once the cable has been served, the thief may merely transport the bicycle or motorcycle away without alerting passersby as to the theft in progress. The present invention overcomes this problem.

SUMMARY OF THE INVENTION

The general purpose of this invention is to provide a locking device with an alarm which embraces all the advantages of similarly employed devices and possesses none of the aforedescribed problems. To attain this, the present invention contemplates a unique locking device having a housing which may be affixed to the frame of the bicycle or motorcycle. Located within the housing is a sensing means and an alarm. A gas impermeable tube or cable is connected to the sensing means on one end and is lockably connected to the housing on the other end. Once the gas impermeable tube is looped around a secure object such as a telephone pole or a bicycle rack, and inserted into the lock portion of the housing and the key is turned, the lock is actuated. If the cable is severed or tampered with, the pressure within the cable will decrease. This decrease in pressure is sensed by the sensing means which in turn actuates the alarm and warns passersby that a theft is in progress. Two preferred embodiments of the invention are disclosed; one utilizing a gas actuating alarm, and a second utilizing an electrically actuated alarm. In each case, however, the alarm is actuated in response to the sensing means sensing a decrease in pressure in a gas impermeable tube It is, therefore, an object of the present invention to provide a locking device having an alarm associated therewith.

Another object is to provide a locking device and an alarm wherein the alarm may be actuated in response to a decrease in pressure in a conduit associated with the locking device.

A further object is to provide a lock alarm mechanism which is simple in construction, economical to manufacture, and well adapted for use in association with a bicycle or motorcycle.

Still another object is to provide an alarm and lock which are virtually burglar proof and tamper proof and which, if tampered with, provide a sound which can be heard for at least half a mile.

Other objects and many of the attendant advantages of this invention will be readily appreciated as the same becomes better understood by reference to the following detailed description when considered in connection with the accompanying drawings.

BRIEF DESCRIPTION OF THE DRAWINGS

FIG. 4 is a top view of the locking device shown in FIG. 2 with a portion of the housing removed.

FIG. 5 is a bottom view of the locking device shown in FIG. 2.

FIG. 6 is a side view of an alternative embodiment of the invention, with a portion of the housing removed.

FIG. 7 is a front view of the locking device shown in FIG. 6 with a portion of the housing removed.

DESCRIPTION OF THE PREFERRED EMBODIMENT

Figure 1:
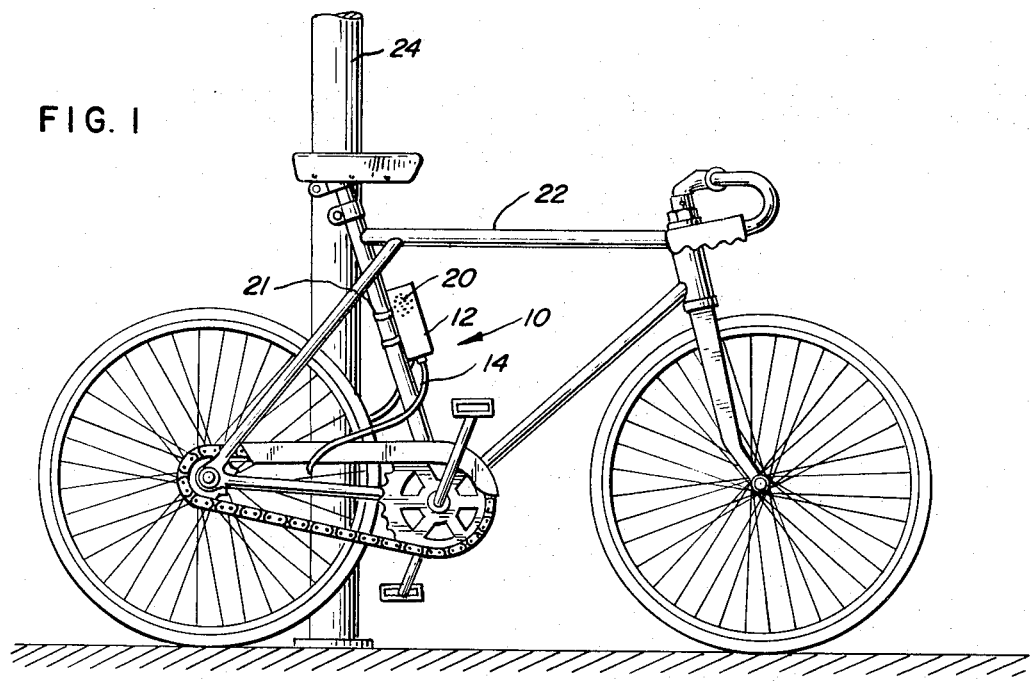
FIG. 1 is a perspective view of the lock and alarm device of the present invention being utilized to lock a bicycle to an immovable object.

Referring now to the drawings, wherein like reference characters designate like or corresponding parts throughout the several views, there is shown in FIG. 1, a locking device 10 having an alarm associated therewith. The locking device 10 comprises a housing 12 which is adapted to be secured to the object to be locked. Connected to the housing 12 is a gas impermeable tube 14. One end of the gas impermeable tube 14 is lockably connected to the housing 12 and may be removed through the use of a key. The other end is fixedly connected to the housing 12. The gas impermeable tube 14 comprises an inner lining 16 (FIG. 5) having an armor cable sheath 18 wrapped therearound. The inner lining 16 in the preferred embodiment may be manufactured from nylon while the outer cable sheath may be armor braided metal. In effect, the gas impermeable tube 14 is a metallic cable having a nylon inner tube inserted therein. However, it will be recognized that similar materials may also be utilized. Located within the housing 12 of the locking device 10 is an alarm. When actuated, the sound waves emitted by the alarm pass through a plurality of apertures 20 provided for in the housing 12.

The locking device 10 as shown in FIG. 1, is adapted to be mounted through the use of suitable brackets 21 to the frame 22 of the device to be locked. For example, FIG. 1 shows the locking device 10 being used in association with a bicycle. The gas impermeable tube 14 is passed through a portion of the frame 22 and around a pole or other immovable object 24 and is then locked to the housing 12. In this manner, the device to be locked, or namely the bicycle in FIG. 1, is then secured to the pole 24. If a thief tampers with the locking device 10 and severs the gas impermeable tube 14, a sensing device, to be described below, located within the housing 12, actuates an alarm which is then sounded notifying the public that someone is attempting to steal the bicycle.

It will be recognized, that while the locking device 10 is described for locking a bicycle, it may be utilized to lock other objects such as motorcycles, mobile homes, skis, lawn mowers, scooters, etc. It will also be recognized that the length of the gas impermeable tube 14 may be shortened or lengthened to accommodate these objects. Similarly, depending upon the desired weight and strength, the cable sheath 18 placed around the inner lining 16 of the gas impermeable tube 14 may be manufactured from any suitable material and may be constructed to any reasonable thickness thereby decreasing the possibility of severing lining 16 and increasing the locking ability of the locking device 10.

Referring now to FIGS. 2–5, the locking device 10, which constitutes a first preferred embodiment of the invention, will be described in greater detail. Located within the housing 12 are the two major components of the locking device 10, i.e., a sensing device 30 and an alarm device 40. The sensing device 30 comprises a three-way pressure valve 32. The three-way pressure valve is a conventional valve having three outlet valves 34, 36 and 38. As will be explained below, the three-way valve 32 functions as a pressure sensing device and is adapted to sense a decrease in pressure in the gas impermeable tube 14 which may be caused by someone piercing the inner lining 16 thereby reducing the gas pressure within the gas impermeable tube 14.

The alarm device 40 comprises a conventional pressure actuated horn 42 and a source of gas under pressure 44. The source of gas pressure 44 comprises a conventional aerosol can 45 having a conventional pressure valve 46. The pressure valve 46 is connected to the outlet valve 38 of the three-way valve 32 by a piercing fitting 48. As long as the outlet valve 38 of the three-way valve 32 is closed, no gas can escape from the aerosol can 45. The horn 42 has an inlet opening 50 which is connected by a suitable conduit or path 52 to the outlet valve 36 of the three-way valve 32. A conventional shut-off valve 54 is located within the path 52. So long as the outlet valves 36 and 38 are closed, no gas can pass through the path 52 to actuate the horn 42. However, when the outlet valves 36 and 38 are both opened, gas from the aerosol can 45 will pass through the three-way valve 32 and through the path 52 to actuate the horn 42 thereby sounding an alarm.

Figure 3:
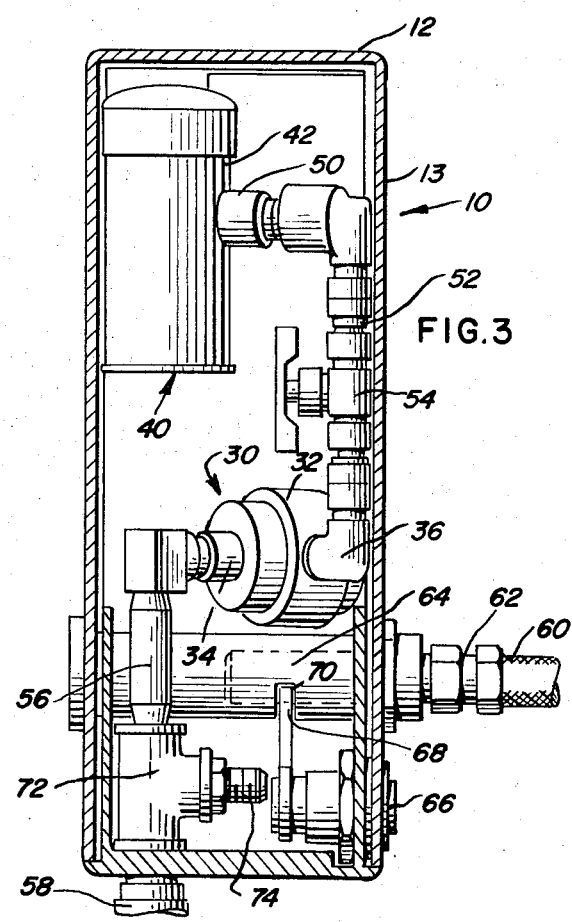
FIG. 3 is a front view of the locking device shown in FIG. 2 with a portion of the housing removed.

The third outlet valve 34 of the three-way valve 32 is connected by a path 56 to one end 58 of the gas impermeable tube 14. The second end 60 of the gas impermeable tube 14 is connected by a barbed fitting 62 to a suitable stopper or plug 64 which is provided to pressure seal the end 60 of the gas impermeable tube 14. The plug 64 is adapted to be inserted into the housing 12 as shown in FIG. 3. A conventional lock 66 is provided in the housing 12. When the lock 66 is opened, the cover 13 of the housing 12 may be removed. When the lock 66 is in its locked position, the cover 13 cannot be removed from the housing 12. The lock 66 also contains a locking cam 68 which is adapted to mate with a slot 70 located in the plug 64 in such a manner so that when the lock 66 is closed, the plug 64 is locked to the housing 12. The only way in which the plug 64 can be removed from the housing 12 is by unlocking the lock 66 and rotating the locking cam 68 out of the slot 70.

The first end 58 of the gas impermeable tube 14 is permanently connected by a suitable fitting, such as a barbed fitting, to the housing 12 and is connected through a conventional "Tee" 72 to the path 56 and to the three-way valve 32. Also connected to the "Tee" 72 is a conventional air inlet valve 74. The air inlet valve 74 may be used to increase the air pressure throughout the gas impermeable tube 14 by inserting air from a conventional air source or air pump which can be found at any automobile service station.

In operation, when a person desires to lock a device such as the frame 22 of the bicycle shown in FIG. 1 to an immovable object 24, he would unlock the lock 66 and open the cover 13 of the housing 12. The user would, through the use of a conventional air hose, add air or gas through the valve 74. This will cause the pressure to increase in the gas impermeable tube 14 and will also cause the outlet valves 34, 36 and 38 of the three-way valve 32 to close.

Figure 2:
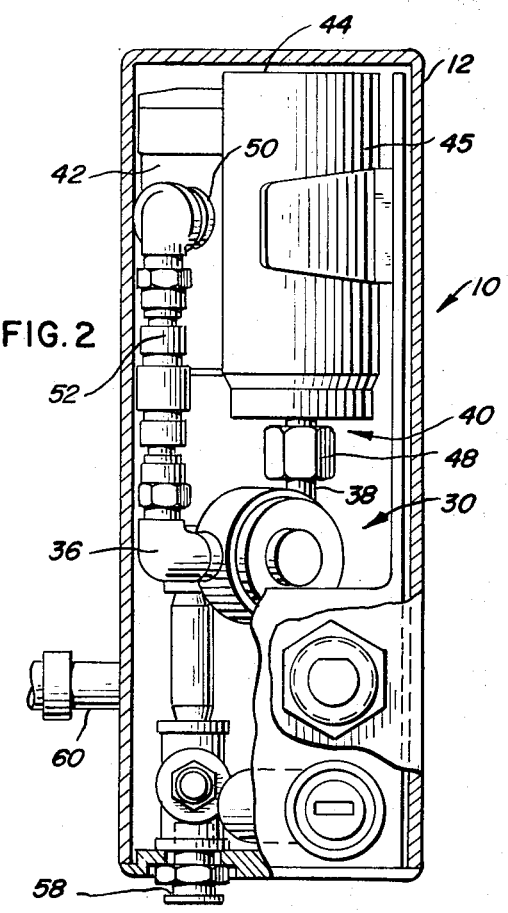
FIG. 2 is a side view of the locking device of the present invention with a portion of the housing removed.

So long as the gas impermeable tube remains pressure sealed, the user will not have to add additional air or gas and the outer valves 34, 36 and 38 will remain closed. After the three-way valve 32 has been closed, the aerosol can 45 may be inserted into the housing as shown in FIG. 2. The shut-off valve 54 may then be opened and the cover 13 closed.

Next, the user takes the gas impermeable tube 14 and wraps it around the immovable object, such as the pole 24 in FIG. 1, and inserts the plug 64 into the housing as shown in FIG. 3. After locking the lock 66, the locking device and alarm 10 are then activated and the bicycle is securely locked to the pole 24. If a thief begins to tamper with the gas impermeable tube 14 and severs the inner lining 16 of the gas impermeable tube 14, pressure will decrease in the tube 14. This decrease in pressure will cause the three-way valve to open thereby completing a path between the source of gas pressure 44 of the aerosol can 45 and the horn 42. This will cause the horn to start sounding. A conventional aerosol can will contain enough pressure to maintain the sounding of the horn for a complete five minutes. The horn will continue to sound until the user inserts his key in the lock 66, opens the cover 13 and closes the shut-off valve 54.

Thus it can be seen that the locking device 10 provides a suitable alarm system which will alert passersby within the vicinity of the locking device 10 that a theft is in progress.

The locking device and alarm described above in connection with FIGS. 2–5 utilizes a gas actuated alarm. Referring now to FIGS. 6 and 7, a second preferred embodiment of the invention 110 is disclosed. This second embodiment of the invention 110 is similar to the one described above, except that instead of utilizing a gas actuated alarm, an electrically actuated alarm is utilized. It will be readily recognized, that the locking device 110 shown in FIGS. 6 and 7 is similar to the locking device 10 described in connection with FIGS. 2–5 and therefore, only the differences will be described.

Located within the housing 12 of the locking device 110 is an electrical sensing device 130 and an electrically actuated alarm 140. The sensing device 130 contains within its housing a normally open pressure actuated electrical switch 132. When a pressure decrease occurs in the tube 14, the switch 132 closes and completes an electrical circuit through a conductor 134, a plurality of D.C. batteries 136, a conventional electrical horn 142 and a return lead 138 thereby actuating the electrical horn 142.

To operate the locking device 110, the user would supply air pressure to the gas impermeable tube 14 through the conventional air inlet valve 74. This would cause the air pressure switch 132 of the sensing device 130 to open. The batteries 136 are inserted into the position shown in FIGS. 6 and 7. The cover 13 is closed. The impermeable tube 14 is then wrapped around an immovable object and the plug 64 is inserted into the housing 12. Lastly, the lock 66 is closed, causing the locking cam 68 to engage the aperture 70 thereby locking the gas impermeable tube 14 to the housing. If the gas impermeable tube 14 is severed, the sensing means 130 senses the decrease pressure in the gas impermeable tube 14 and causes the switch 132 to close. This completes an electrical circuit causing the horn 142 to sound.

As an additional safety feature, the electrical circuit described above can be made to pass through the locking cam 68 and thus, if the locking cam 68 is in its opened or unlocked position, no electrical circuit will be completed and the alarm 142 will be inoperable. Thus, to turn off the alarm after it has actuated, owe need only open the lock 66 thereby rotating the locking cam 68 out of the aperture 70 and breaking the electrical circuit to the alarm 142.

In conclusion, it can be seen that the locking device 10 and the locking device 110 both utilize a sensing device for sensing a decrease in pressure in a gas impermeable tube. If the tube is severed, the gas pressure within the tube will decrease and an alarm will sound.

It should be understood, of course, that the foregoing disclosure relates to only two embodiments of the invention and that numerous modifications or alterations may be made therein without departing from the spirit and scope of the invention as set forth in the appended claims.

What is claimed is:

1. A portable locking apparatus adapted to be mounted on a device to be locked, including an alarm means for detecting the tampering with of a portion of the locking apparatus, comprising:
    a housing susceptible of being mounted on a device to be locked;
    an alarm means located in said housing;
    a sensing means located within said housing for actuating said alarm when a decrease in pressure is sensed by said sensing means; and
    a flexible gas impermeable tube having a first end and a second end, said tube being adapted to encircle a portion of said device to be locked wherein said first end is pressure sealed whereby after said tube encircles said portion of said device to be locked, said first end is connected to said housing by a locking means and wherein said second end is secured to said sensing means whereby when said pressure in said tube decreases, said alarm is actuated by said sensing means.

2. The apparatus of claim 1 wherein said alarm means comprises:
    a gas actuated alarm; and
    a source of pressurized gas to actuate said alarm.

3. The apparatus of claim 2 wherein said sensing means is connected to said source of gas and wherein said sensing means allows gas to flow from said source to actuate said alarm only when a decrease in pressure in said tube is sensed.

4. The apparatus of claim 3 wherein said sensing means comprises a normally closed valve in a path formed between said source of gas and said alarm and wherein said valve is opened when a decrease in pressure in said tube is sensed.

5. The apparatus of claim 4 further comprising a means for selectively increasing the pressure within said tube.

6. The apparatus of claim 4 further comprising means located within said housing for selectively preventing the actuation of said alarm means and for selectively deactuating said alarm means.

7. The apparatus of claim 4 wherein said gas impermeable tube comprises a nylon inner tube located within an armor cablelike outer tube.

8. The apparatus of claim 1 wherein said alarm means comprises:
    an electrically actuated alarm; and
    a source of electrical power for said alarm.

9. The apparatus of claim 8 wherein said sensing means is electrically connected between said alarm and said source of electrical power and wherein said sensing means completes an electrical circuit between said alarm and said source of electrical power to actuate said alarm only when a decrease in pressure in said tube is sensed.

10. The apparatus of claim 9 wherein said sensing means comprises a normally open pressure sensitive switch connected between said source of electrical power and said alarm and wherein said switch is closed when a decrease in pressure in said tube is sensed.

11. The apparatus of claim 10 wherein said gas impermeable tube comprises a nylon inner tube located within an armor cable-like outer tube.

12. The apparatus of claim 8 further comprising a means for selectively increasing the pressure within said tube.

13. The apparatus of claim 8 further comprising means for selectively preventing the actuation of said alarm means and for selectively deactuating said alarm means.

14. A portable locking apparatus adapted to be mounted on a device to be locked, including the tampering with of a portion of the locking apparatus, comprising:
    a housing susceptible of being mounted on a device to be locked;
    a gas actuated alarm located within said housing;
    a source of pressurized gas located in said housing to actuate said alarm;
    a sensing means located within said housing for releasing said gas from said source and for actuating said alarm when a decrease in pressure is sensed by said sensing means, said sensing means including a valve in a path formed between said source of gas and said alarm; and
    a flexible gas impermeable tube having a first end and a second end, said tube being adapted to encircle a portion of said device to be locked wherein said first end is pressure sealed whereby after said tube encircles said portion of said device to be locked, said first end is connected to said housing by a locking means and wherein said second end is secured to said sensing means whereby when said pressure in said tube decreases said valve opens and said alarm is actuated.

15. A portable locking apparatus adapted to be mounted on a device to be locked, including an alarm means for detecting the tampering with of a portion of the locking apparatus, comprising:
    a housing susceptible of being mounted on a device to be locked;

an electrically actuated alarm located within said housing;

a source of electrical power located in said housing for actuating said alarm;

a sensing means located within said housing for completing an electrical circuit between said source of electrical power and said alarm when a decrease in pressure is sensed by said sensing means, said sensing means including a switch electrically connected between said source of electrical power and said alarm; and a flexible gas impermeable tube having a first end and a second end, said tube being adapted to encircle a portion of said device to be locked wherein said first end is pressure sealed whereby after said tube encircles said portion of said device to be locked, said first end is connected to said housing by a locking means and wherein said second end is secured to said sensing means whereby said pressure in said tube decreases, said switch closes and said alarm is actuated.

* * * * *